United States Patent
Sugaya

(10) Patent No.: US 7,212,333 B2
(45) Date of Patent: May 1, 2007

(54) OPTICAL NODE

(75) Inventor: Yasushi Sugaya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/224,067

(22) Filed: Sep. 13, 2005

(65) Prior Publication Data

US 2006/0061855 A1 Mar. 23, 2006

(30) Foreign Application Priority Data

Sep. 17, 2004 (JP) .............................. 2004-270640

(51) Int. Cl.
*H04S 4/00* (2006.01)
*H04B 10/12* (2006.01)

(52) U.S. Cl. ..................................... 359/334
(58) Field of Classification Search ................. 359/334
See application file for complete search history.

(56) References Cited

U.S. PATENT DOCUMENTS

| | | | | |
|---|---|---|---|---|
| 6,262,823 | B1 * | 7/2001 | Nowatzyk | 398/141 |
| 6,452,716 | B1 * | 9/2002 | Park et al. | 359/334 |
| 6,611,368 | B1 * | 8/2003 | Grant et al. | 359/334 |
| 6,748,136 | B2 * | 6/2004 | Headley et al. | 385/27 |
| 6,844,961 | B2 * | 1/2005 | Odate et al. | 359/334 |
| 2002/0075561 | A1 * | 6/2002 | Krummrich | 359/334 |
| 2003/0081307 | A1 * | 5/2003 | Fludger et al. | 359/334 |

FOREIGN PATENT DOCUMENTS

| JP | 2002-6349 | 1/2002 |
|---|---|---|
| JP | 2002-221742 | 8/2002 |

OTHER PUBLICATIONS

Peter J. Winzer, et al., "Tuning Speed Requirements for Time-Division Multiplexed Raman Pump Lasers", Proceedings of the 28th European Conference on Optical Communication; vol. 2; Sep. 10, 2002.
C.R.S. Fludger, et al., "Novel Ultra-broadband High Performance Distributed Raman Amplifier Employing Pump Modulation", OFC 2002, pp. 183-184, WB4.

* cited by examiner

*Primary Examiner*—Jack Keith
*Assistant Examiner*—Eric Bolda
(74) *Attorney, Agent, or Firm*—Staas & Halsey LLP

(57) ABSTRACT

An optical node is configured to enable time-division distribution of pump light for effectively utilizing pump power. The optical node is provided with an excitation light source unit for Raman amplification, outputting Raman excitation light of a plurality of wavelengths; a control unit outputting the Raman excitation light of the plurality of wavelengths, wavelength by wavelength on a time division basis; and a Raman amplifier distributing and feeding the Raman excitation light of the plurality of wavelengths, wavelength by wavelength on a time division basis, in the opposite direction to the signal light transmission direction. In each receiving port, a period of the Raman excitation light being output wavelength by wavelength on a time division basis is set shorter than a signal light response time in the Raman amplifier to the Raman excitation light.

6 Claims, 9 Drawing Sheets

OPTICAL NODE

BACKGROUND OF THE INVENTION

1. Field of the Invention

The present invention relates to an optical node having a plurality of receiving ports receiving wavelength division multiplex optical signals which require Raman amplification for low noise characteristic, and more particularly an optical node capable of controlling Raman power distribution easily even in case of extension or deletion of the receiving ports.

2. Description of the Related Art

In recent years, a photonic network employing the wavelength division multiplex (WDM) optical transmission technique has been constructed for practical application. In addition to point-to-point transmission having been introduced so far, optical nodes for connecting more than two points and distributing multiplexed signals to a plurality of ports (hereafter the term 'node' conceptually includes optical cross connect equipment, optical add/drop multiplexer, etc.) are disposed in the photonic network shown in FIG. 1. With such two-dimensional deployment of the optical transmission (to a mesh network), efficient allocation of network apparatuses is being promoted.

Here, in a backbone network, it has been a known technique that a plurality of ports are concentrated in one point, and signals are distributed to the different ports in the form of light, and thereby network flexibility is increased with reduced network costs. For example, in FIG. 1, in anode #2, optical signals are received from nodes #0 and #1, and distributed to the ports toward nodes #3 and #4.

When such a multi-port distribution node in which signals on a plurality of receiving ports are multiplexed and distributed to one or a plurality of transmitting ports is applied, when transmission spans $10_1$, $10_2$, $10_3$, $10_4$ of the wavelength or channel paths passing through these nodes are long, low noise is required in these channel paths.

To meet the above requirement, in the conventional example, there has been incorporated a method of disposing Raman fiber amplifiers for Raman amplification, in which excitation light is input to each receiving node side of the long-haul optical transmission ports.

FIG. 2 shows an explanation diagram illustrating the principle of the Raman fiber amplifier. Optical fiber Raman amplification (simply, Raman amplification) is a phenomenon of stimulated emission being produced by Raman scattering when strong excitation light is incident on an optical fiber, and amplification being obtained on a wavelength region approximately 100 nm longer than the optical excitation wavelength.

Accordingly, for example, in case of multiplexing three channels, excitation light $f_{p1}$, $f_{p2}$, $f_{p3}$ each corresponding to the three cannels is transmitted from a Raman light source LD to each receiving line side. As a result, an amplification function is performed on each wavelength range $f_{r1}$, $f_{r2}$, $f_{r3}$, which is approximately 100 nm longer than the corresponding optical excitation wavelength, and flatness property of the wavelength amplification can be obtained in an optical signal range.

In FIG. 1, in order to perform Raman amplification in optical transmission line spans $10_1$, $10_2$, the excitation light from a Raman light source LD is forwarded on two receiving port sides from node #2. Similarly, in order to perform Raman amplification in optical transmission line spans 103, 104, the excitation light from each Raman light source LD in node #3, #4 is forwarded on each receiving port side.

Here, such a Raman fiber amplification apparatus requires large power consumption, size and cost. Therefore, it requires increased power consumption, size and cost to distribute the excitation light to the plurality of receiving ports in each node. This may impede installation of such a node.

FIG. 3 shows an exemplary configuration of a multi-port distribution optical node, having a Raman optical amplifier disposed on each receiving port side.

Corresponding to each transmission line fiber 10, a pump light source 3 for distributed Raman amplification is provided. In a wavelength division multiplex (WDM) coupler 2, signal light 1 is multiplexed with pump light from pump light source 3. The output of WDM coupler 2 is input to an optical multiplex & distribution unit 5 having an optical cross connect function or an optical add/drop function, through an EDFA (Erbium-doped fiber amplifier) 4.

In FIG. 3, the amplified signal light 1 is transmitted on an output terminal. Meanwhile, pump light is supplied from pump light source 3 for Raman amplification, to transmission line fiber 10 through WDM coupler 2. With this, signal light 1 is Raman amplified in transmission line fiber 10, amplified in EDFA 4, and divided on a wavelength-by-wavelength basis in optical multiplex & distribution unit 5, and then distributed to each corresponding port. Thereafter, signal light 1 is amplified in EDFA 41, which is disposed on each output port side, and forwarded to each transmission line fiber 10.

Such disposition of the costly Raman amplification pump 4 on each receiving port results in a high optical node cost. This becomes an impeding factor against optical node application.

As a second conventional example, FIG. 4 shows an optical node configuration having a pump light source for distributed Raman amplification concentrated into one, which has been disclosed in the official gazette of the Japanese Unexamined Patent Publication No. 2002-6349. As shown in FIG. 4, in optical multiplex & distribution unit 5, a Raman pump common supply unit 30 is commonly provided for a plurality of transmission line fibers 10.

Raman pump common supply unit 30 includes a plurality of pump light sources 3 for Raman amplification, each provided for each of a plurality of wavelengths or channels; and a coupler 6 for synthesizing the outputs of pump light sources $3_1$, $3_2$, $3_3$. The outputs of pump light sources $3_1$, $3_2$, $3_3$ for Raman amplification each provided for each of the plurality of wavelengths are controlled by an LD controller 7.

More specifically, the pump light from pump light source 3 for Raman amplification is supplied to transmission line fibers $10_1$–$10_4$ via pump coupler 6 and WDM couplers $2_1$–$2_4$, and Raman amplified. The Raman-amplified signal light 1 is further amplified in EDFA $4_1$–$4_4$, and divided wavelength by wavelength in optical multiplex & distribution unit 5, and further distributed and output to each predetermined port. Further, signal light 1 is amplified on the output port side by EDFA $4_5$–$4_8$, and supplied to transmission line fibers $10_5$–$10_8$.

According to the configuration shown in this FIG. 4, Raman pump common supply unit 30 is provided. However, the total pump power is not decreased, as compared with the configuration shown in FIG. 3. In addition, because the power distributed to each port is fixed by a branching ratio of pump coupler 6, there is a problem of lack of flexibility in power distribution, which is to be secured at the time of extension or deletion of ports.

Meanwhile, in the distributed Raman amplification which feeds excitation light to be transmitted to the transmission line in the reverse direction to the signal light, it has been known that a response time when the excitation light functions to a signal light gain is delayed to several hundred microseconds. By utilizing this phenomenon, a method has been proposed in the U.S. Pat. No. 6,611,368, and in a conference paper "Tuning speed requirements for time-division multiplexed Raman pump lasers" by Winzer et al., 4.1.4, ECOC (European Conference on Optical Communication) 2002. According to the above disclosure, the excitation light of a plurality of different wavelengths or channels is time-division multiplexed at a frequency sufficiently higher than the Raman response speed.

Using this method, depending on a condition, it becomes possible to improve noise characteristic by approximately 1 dB.

In FIG. 5, an explanation diagram illustrating the principle of this method of time-division multiplexing of the Raman excitation light is shown. In this FIG. 5, Raman light sources $3_1$, $3_2$, $3_3$ outputting Raman excitation light having frequencies $\lambda_1$, $\lambda_2$, $\lambda_3$ emit light at all times. The output light is input to each corresponding optical modulator $8_1$, $8_2$, $8_3$, which is formed of ferroelectric crystal such as $LiNbO_3$ and $LiTaO_3$.

Optical modulators $8_1$, $8_2$, $8_3$ performs pulse modulation using time-division control pulses having mutually shifted phases fed from a pulse generator $8_0$. The outputs of optical modulators $8_1$, $8_2$, $8_3$ are coupled by an optical coupler 6, and further transferred, via a coupler 2, to an optical transmission line 10 in the reverse direction to the direction of optical signal transmission.

Accordingly, on optical transmission line 10, as shown in the enclosed chart shown in the lower left of FIG. 5, Raman excitation light having wavelengths $\lambda_1$, $\lambda_2$, $\lambda_3$ is time-division multiplexed and forwarded at a period not greater than 0.1 msec, namely at a speed not lower than 10 kHz. By this, a Raman amplified wavelength-multiplexed optical signal having wavelengths $\lambda_1$, $\lambda_2$, $\lambda_3$ appears on the output of coupler 2, which is further amplified in EDFA 4.

According to the above paper "Tuning speed requirements for time-division multiplexed Raman pump lasers", ECOC2002, the method shown in FIG. 5 is reported effective to prevent deterioration of gain efficiency, and a noise characteristic, ordinarily produced between non-modulated excitation light by the Raman effect, which is ordinarily produced on the signal light on the shorter wavelength side. A modulation frequency required in a system shown by the above paper is normally no less than 10 kHz. However, the pump power is not utilized efficiently, since a light extinction time, that is, a time the Raman excitation light is not emitted is long (as shown in FIG. 5 by the bold line in the pulse period generated by pulse generator $8_0$).

To cope with this problem, as another method, it is possible to consider about more effective use of the pump power, which is attained by distributing the pump light even at the above-mentioned light extinction time to the other ports on a time division basis.

SUMMARY OF THE INVENTION

Accordingly, it is an object of the present invention to provide a configuration of an optical node in a time-division multiplex optical signal transmission system utilizing the aforementioned pump power.

According to the present invention, as a first aspect of an optical node configuration to achieve the above object, an optical node has a plurality of receiving ports of wavelength-division-multiplex optical signals requiring Raman amplification for low-noise characteristic. The optical node includes: an excitation light source unit for Raman amplification, outputting Raman excitation light of a plurality of wavelengths; a control unit outputting the Raman excitation light of the plurality of wavelengths, wavelength by wavelength on a time division basis; and a Raman amplifier distributing and feeding the Raman excitation light of the plurality of wavelengths, wavelength by wavelength on a time division basis, in the opposite direction to the signal light transmission direction. In each receiving port, a period of the Raman excitation light being output wavelength by wavelength on a time division basis is set shorter than a signal light response time in the Raman amplifier to the Raman excitation light.

As a second aspect of the optical node in accordance with the present invention, in the above first aspect, the excitation light source unit for Raman amplification includes a plurality of luminescence sources of Raman excitation light corresponding to required frequencies. The control unit includes: a plurality of switches each corresponding to each of the plurality of luminescence sources of Raman excitation light, switching and supplying the Raman excitation light to the plurality of receiving ports; a switch controller controlling the plurality of switches; and an LD controller controlling light emission from each of the plurality of luminescence sources of Raman excitation light.

As a third aspect of the optical node in accordance with the present invention, in the above second aspect, when switching and supplying the Raman excitation light to the plurality of receiving ports, the switch controller controls time-averaged power of the Raman excitation light to be supplied to the receiving ports, by controlling a duty ratio of the Raman excitation light switched by the plurality of switches.

As a fourth aspect of the optical node in accordance with the present invention, in the second aspect, the LD controller controls the Raman excitation light power to be supplied to the receiving ports, by controlling the emission power of the plurality of luminescence sources of Raman excitation light.

As a fifth aspect of the optical node in accordance with the present invention, in the second aspect, port extension during operation can be achieved by respectively connecting receiving ports for the extension to idle ports in the plurality of switches, and updating a period of switching and supplying the Raman excitation light to the plurality of receiving ports, by the plurality of switches controlled by the switch controller.

As a sixth aspect of the optical node in accordance with the present invention, in the second aspect, the optical node further includes a calculation processing unit for calculating the effective power of the required excitation light for the plurality of receiving ports. Based on the calculated effective power for the plurality of receiving ports, the calculation processing unit sets to the switch controller the redistribution of a duty ratio of the Raman excitation light to the plurality of receiving ports, and sets to the LD controller the redistribution of emission power of the plurality of luminescence sources of Raman excitation light.

As a seventh aspect of the optical node in accordance with the present invention, in the above sixth aspect, the effective power is calculated by measuring an optical signal-to-noise ratio (OSNR) in the preceding node and a received input level, and calculating as required pump power.

Further scopes and features of the present invention will become more apparent by the following description of the embodiments with the accompanied drawings.

DETAILED DESCRIPTION OF THE INVENTION

The preferred embodiment of the present invention is described hereinafter referring to the charts and drawings. However, it is noted that the embodiments shown below is presented for the sake of better understanding of the invention, and that the scope of the present invention is not limited to the embodiments described below.

Figure 1:
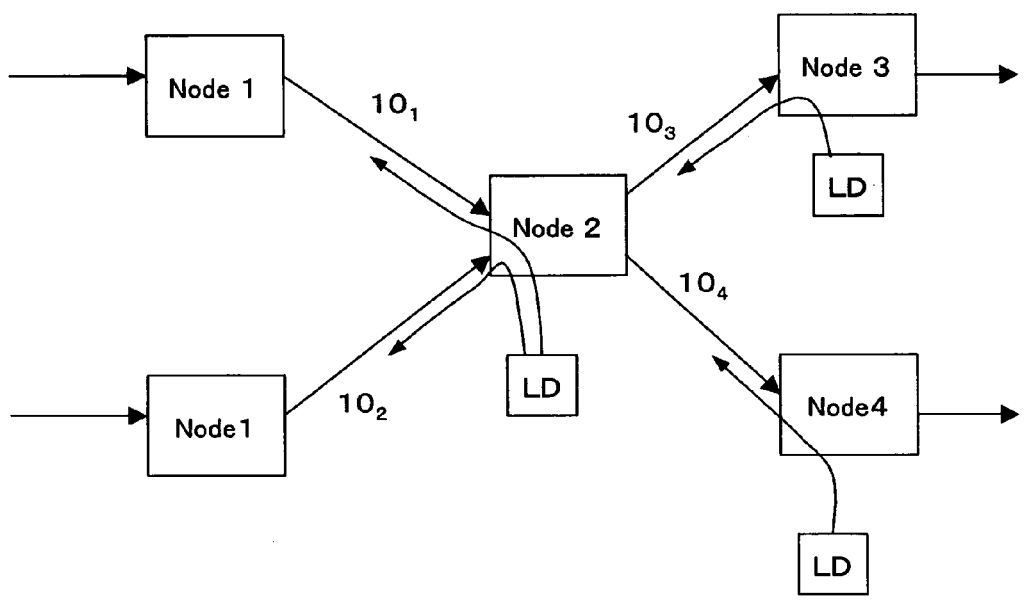
FIG. 1 shows a diagram illustrating an example of implementation of a photonic network using wavelength-division multiplexing (WDM) optical transmission technique.
Figure 2:
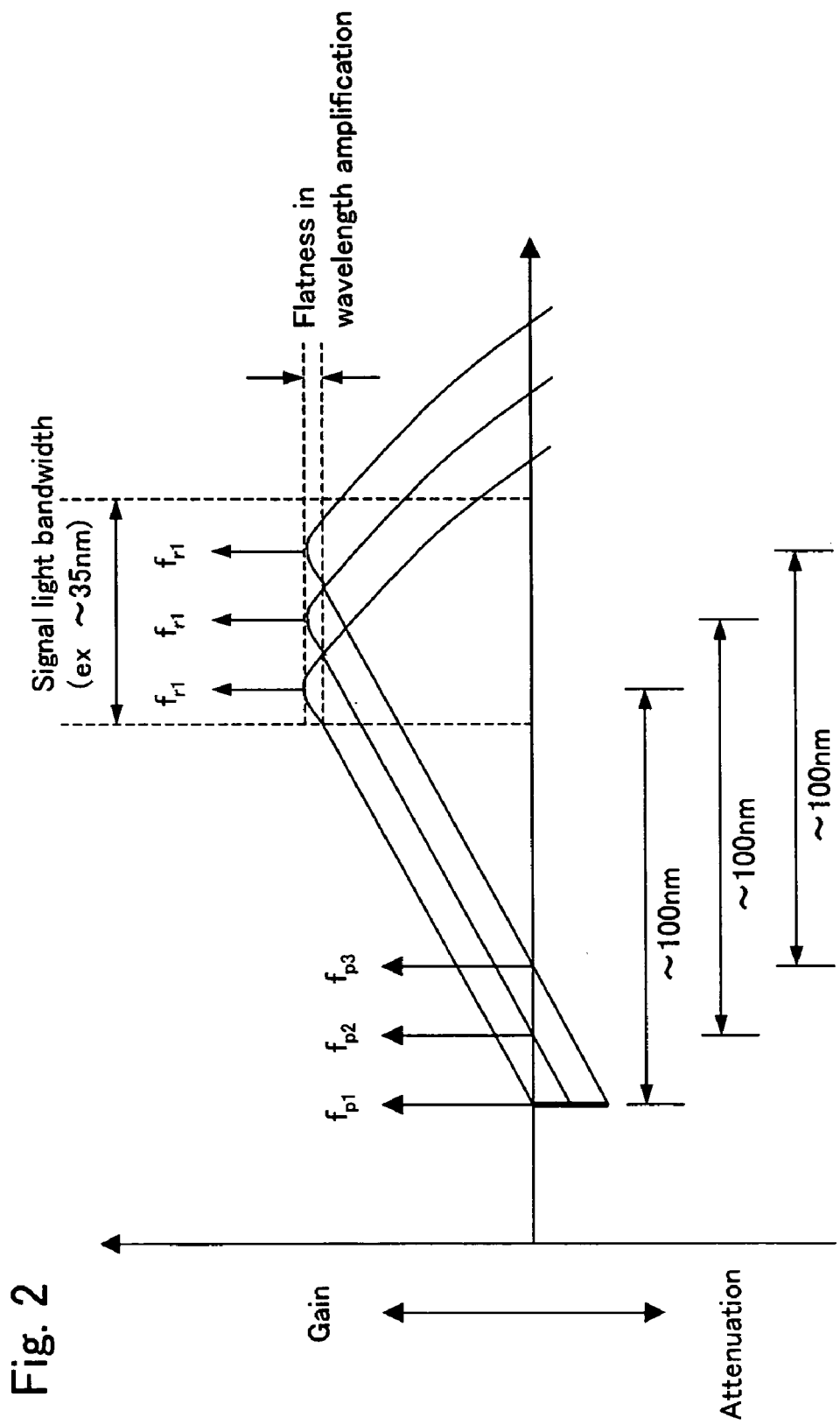
FIG. 2 shows a diagram illustrating the principle of a fiber Raman amplifier.
Figure 3:
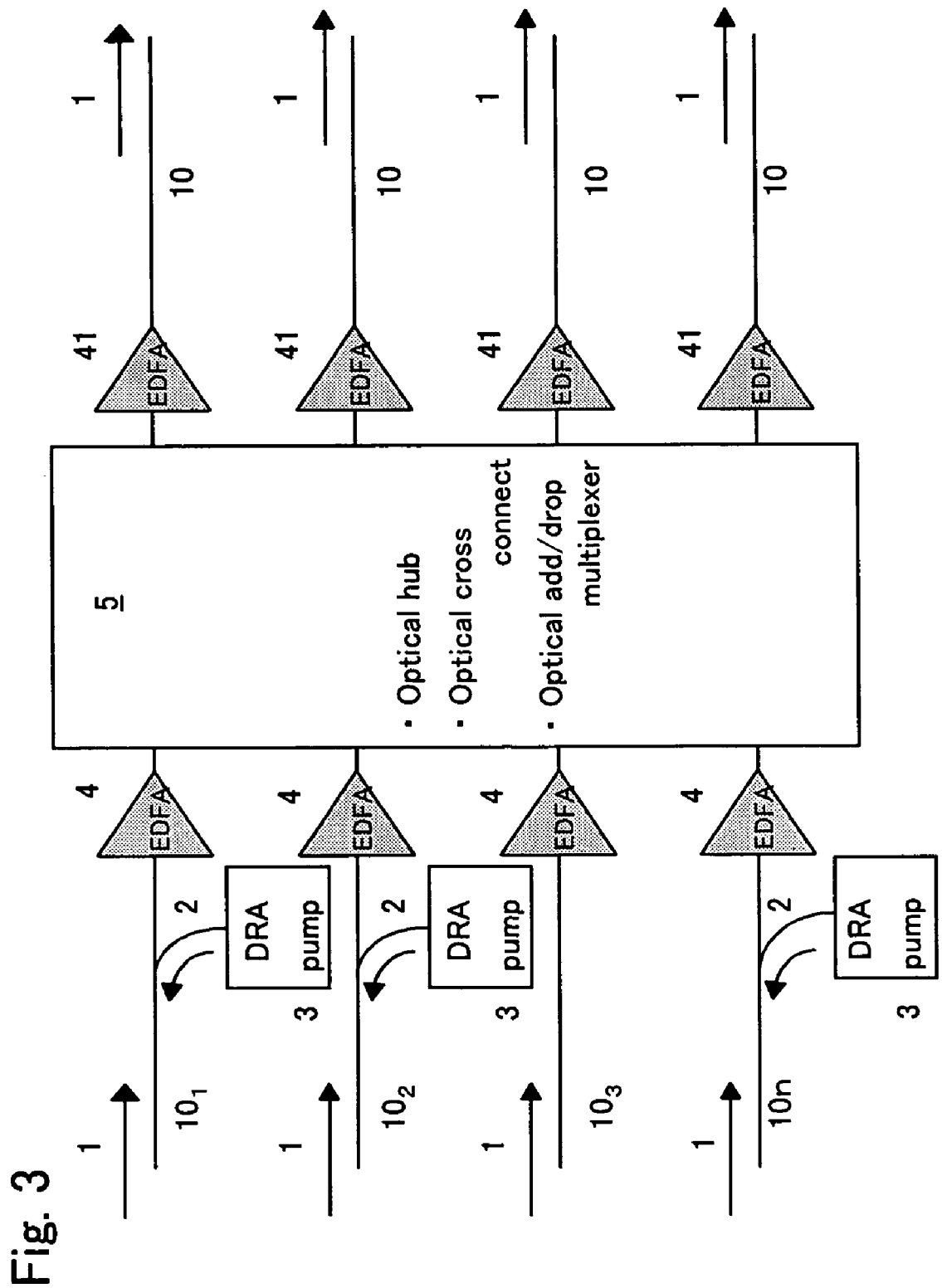
FIG. 3 shows a diagram illustrating one exemplary configuration of an optical node for distribution to a plurality of ports, in case a Raman light amplifier unit is disposed on the receiving port side.
Figure 4:
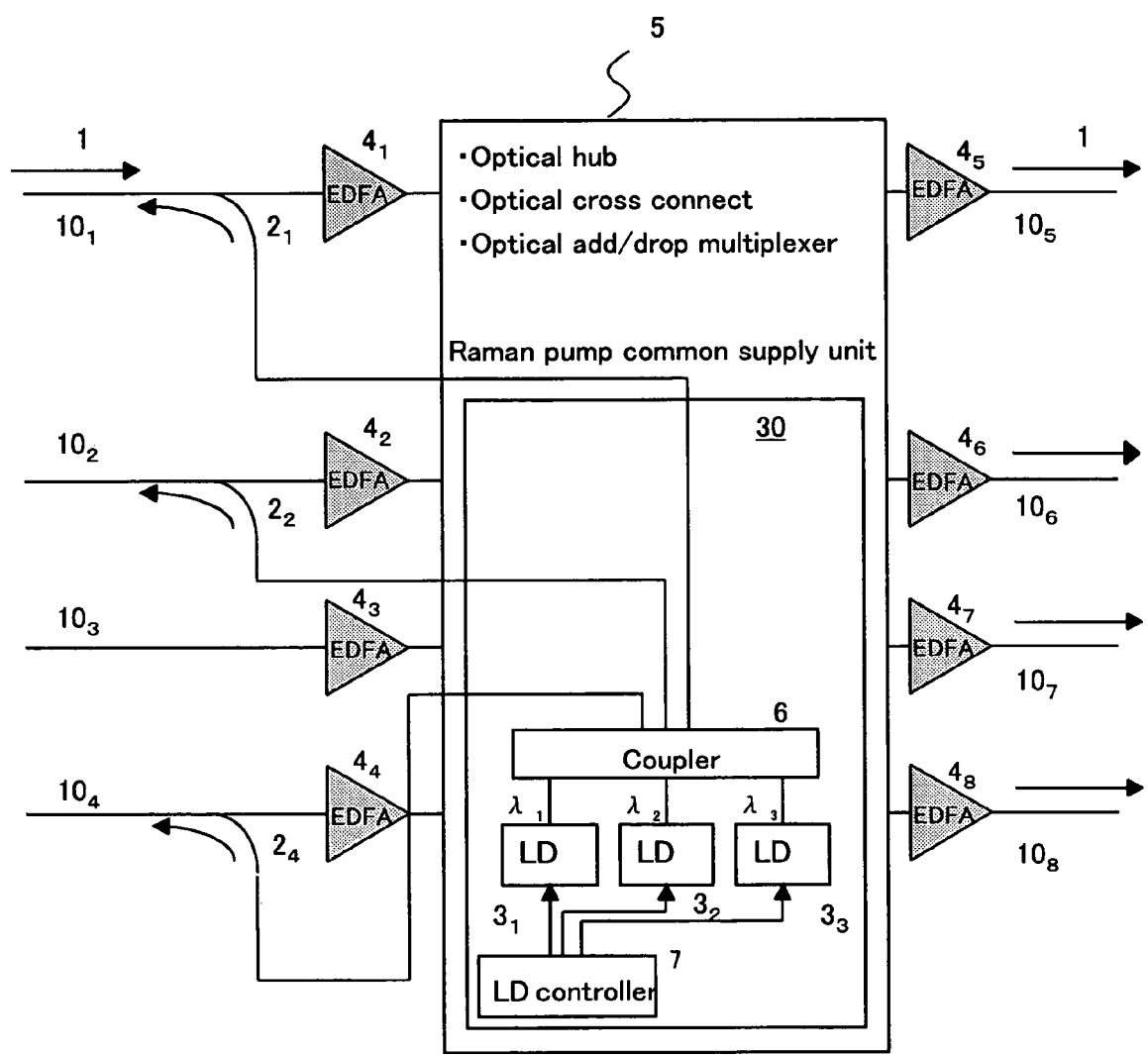
FIG. 4 shows a diagram illustrating an optical node configuration, in which a pump light source for distributed Raman amplification (DRA) is concentrated into one, in a second conventional example.
Figure 5:
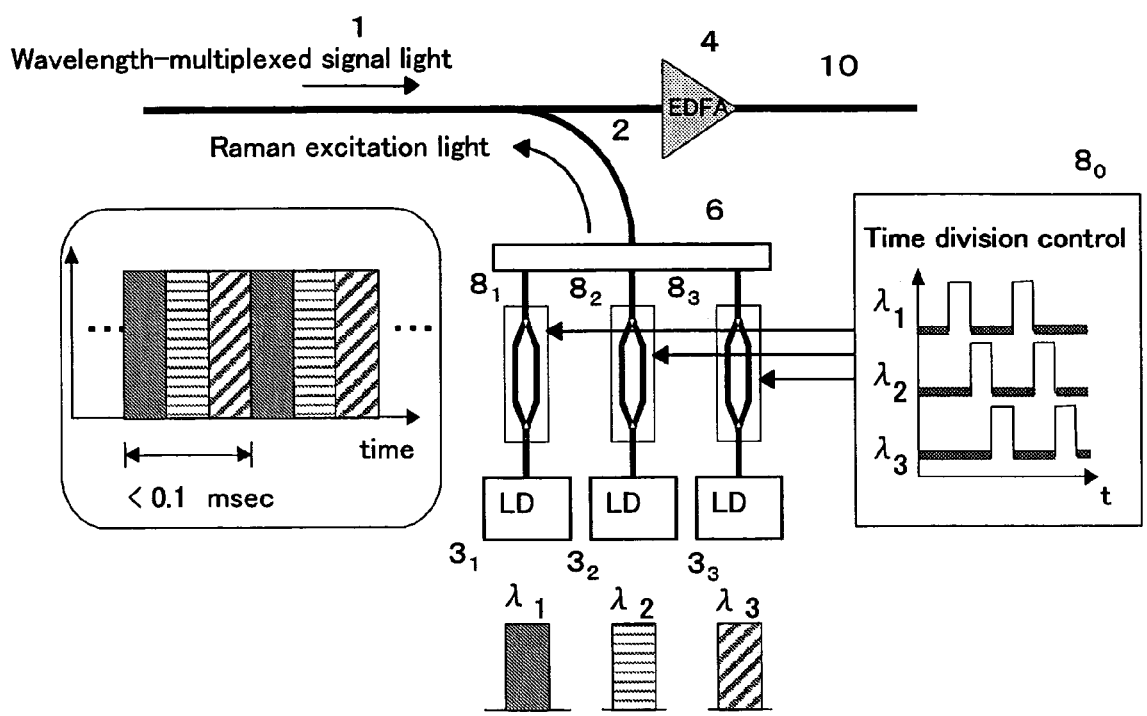
FIG. 5 shows an explanation diagram illustrating the principle of a method of time-division multiplexing of Raman excitation light.
Figure 6:
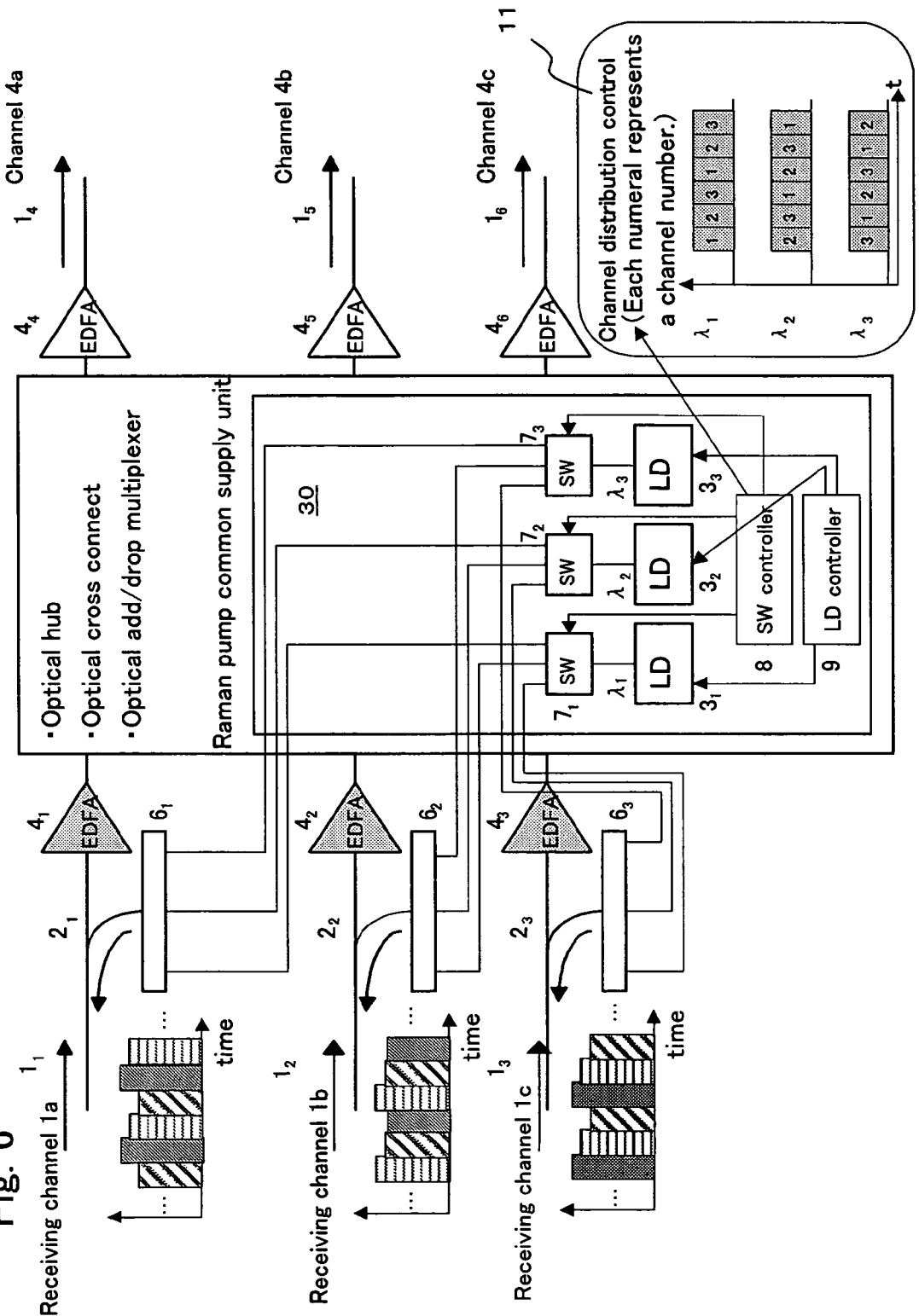
FIG. 6 shows a diagram illustrating a first embodiment of the present invention.

FIG. 6 shows a diagram illustrating a first embodiment of the present invention.

In FIG. 6, as an embodiment example, signal light $1_1$, $1_2$ and $1_3$ respectively having three wavelengths $\lambda_1$, $\lambda_2$ and $\lambda_3$ are input from three receiving ports $1a$, $1b$ and $1c$, which are divided wavelength by wavelength and then output from optical multiplex & distribution unit 5 to output ports $4a$, $4b$ and $4c$.

Optical multiplex & distribution unit 5 includes a Raman pump common supply unit 30. This Raman pump common supply unit 30 further includes Raman light sources (LD) $3_1$, $3_2$, $3_3$ each having wavelengths $\lambda_1$, $\lambda_2$, $\lambda_3$. The output power of each Raman light source (LD) $3_1$, $3_2$, $3_3$ is controlled by LD controller 9.

Meanwhile, as to emission from Raman light source (LD) $3_1$, $3_2$, $3_3$, output timing thereof is controlled by optical switches (SW) $7_1$, $7_2$, $7_3$. This output timing is supplied according to a port distribution control clock 11 output from a switch controller 8.

More specifically, in the example shown in FIG. 6, in pump light source $3_1$ having wavelength $\lambda_1$, supply ports are switched by switch $7_1$, in order of receiving ports $1a$, $1b$, $1c$, according to port distribution control clock 11. In pump light source $3_2$ having wavelength $\lambda_2$, supply ports are switched in order of receiving ports $1b$, $1c$, $1a$. Further, in pump light source $3_3$ having wavelength $\lambda_3$, supply ports are switched in order of receiving ports $1c$, $1a$, $1b$. With this, in order that Raman excitation light of different wavelengths is not emitted simultaneously on the same port, time-division distribution is performed avoiding simultaneous emission between the pump wavelengths.

The pump light supplied from Raman pump common supply unit 30 is forwarded to transmission line fibers $10_1$, $10_2$, $10_3$ from WDM couplers $2_1$, $2_2$, $2_3$, through multiplexers $6_1$, $6_2$, $6_3$.

Accordingly, signal light $1_1$, $1_2$, $1_3$ is Raman amplified at transmission line fibers $10_1$, $10_2$, $10_3$, and transmitted to the corresponding EDFA $4_1$, $4_2$, $4_3$. Signal light $1_1$, $1_2$, $1_3$ is further amplified in EDFA $4_1$, $4_2$, $4_3$ and input to optical multiplex & distribution unit 5.

Next, in optical multiplex & distribution unit 5, the signal light is divided and distributed, wavelength by wavelength, and then amplified in the corresponding EDFA $4_4$, $4_5$, $4_6$. Each output from EDFA $4_4$, $4_5$, $4_6$ is supplied to the corresponding ports (ports $4a$, $4b$, $4c$ in the case shown in FIG. 6).

Here, as shown in FIG. 6, port distribution can be performed in optical switch controller 8, and also power level can be adjusted by adjusting a duty ratio to each port.

However, as to the degree of freedom of a variable power level range, it is more effective to adjust LD power directly in LD controller 9. Therefore, in practical operation, flexible power control and port distribution control can be obtained by coupling the operation of optical switch controller 8 and LD controller 9.

Key devices actualizing the above function are optical switches $7_1$, $7_2$, $7_3$, in which a response frequency of no less than 10 kHz is required (refer to the aforementioned paper by Winzer et al., 4.1.4, ECOC2002). For switching ports by which the above switching time is obtained, a switch using the electrooptic effect or the acousto-optic effect, a magnetooptic switch, or a MEMS (microelectromechanical systems) switch, in which abrupt improvement of switching speed has recently been obtained, is applicable.

As for a switch using the electrooptic effect or the acousto-optic effect, in case of excitation pump distribution in the present invention, a crosstalk of the order of 10 dB between neighboring ports is tolerable, though there have already been developed switches with the order of 5–10 dB. Accordingly, in case of spatial optical port distribution with deflection angle control by the electrooptic effect produced in a silicon or lithium niobate crystal, since the required crosstalk level is sufficiently low, reduction of both loss (by a shortened device length) and cost can be achieved, and it may be possible to obtain a 1×8 switch with 2–3 dB, or on that order.

As to the magnetooptic switch or a three-dimensional MEMS switch, the same issue as the above is existent. Mitigation of a crosstalk specification may enable loss and cost reduction, and a response speed of approximately several ten microseconds may be obtained in such a switch. Furthermore, technology for the systems using a lot of switches, such as an optical packet transmission system, is being studied and developed quite actively today. Therefore, remarkable improvement of higher speed switches will be expected, as well as drastic improvement in the reduction of cost and loss.

Figure 7:
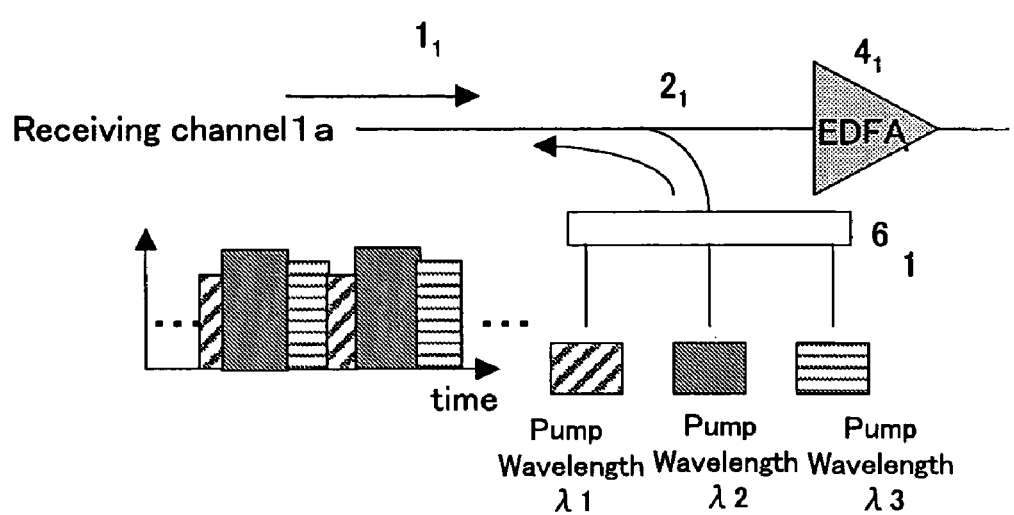
FIG. 7 shows a diagram illustrating a second embodiment of the present invention, explaining an example of adjusting a duty ratio to each port by a switch controller 8 shown in FIG. 6.

FIG. 7 shows a diagram illustrating a second embodiment of the present invention, with the explanation of an example of duty ratio adjustment to each port by a switch controller 8 shown in FIG. 6. For the sake of simple explanation, the figure illustrates only for receiving port 1*a*.

In FIG. 7, for example, pump frequencies $\lambda_1$, $\lambda_2$, $\lambda_3$ are fed into each receiving port after the duty ratio is adjusted on a time division basis. With such duty ratio adjustment for the pump wavelength light, effective pump power can be adjusted arbitrarily.

The above-mentioned duty ratio adjustment can be obtained through adjusting the distribution timing of pump distribution switches $7_1$, $7_2$, $7_3$ shown in FIG. 6, by switch controller 8.

Figure 8:
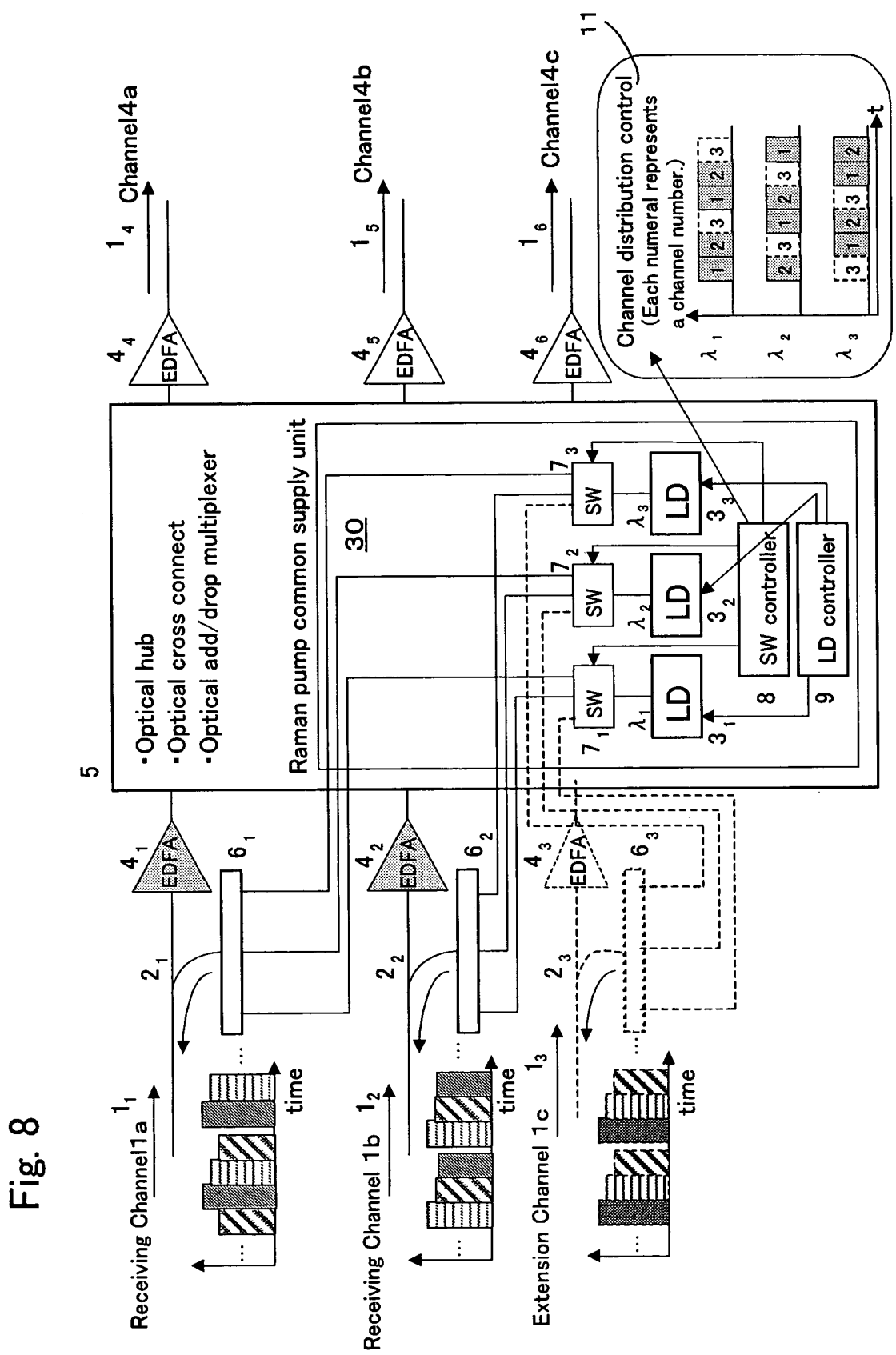
FIG. 8 shows a diagram illustrating a third embodiment of the present invention.

FIG. 8 shows a diagram illustrating a third embodiment of the present invention. In this figure, a case of extending a receiving port 1*c* in a node which originally has two receiving ports 1*a*, 1*b* connected thereon. The basic configuration is identical to the node configuration shown in FIG. 6.

In FIG. 8, the portion shown by the dotted lines is devices and optical lines to be extended, which are to be connected to idle ports in each pump distribution switch $7_1$, $7_2$, $7_3$.

On completion of the above hardware extension procedure, for example, as to pump light source $3_1$ having wavelength of $\lambda_1$, the receiving port is extended in such a manner that the supply port is switched in order of receiving ports 1*a*, 1*b*, 1*c*, 1*a*, 1*b*, 1*c*, which has previously been switched in order of receiving ports 1*a*, 1*b*, 1*a*, 1*b*.

Further, similar to the first embodiment, switch controller 8 controls each optical switch $7_1$, $7_2$, $7_3$ with time-division distribution timing as shown in port distribution control timing 11, so as to prevent pump light sources $3_1$, $3_2$, $3_3$ having wavelengths $\lambda_1$, $\lambda_2$, $\lambda_3$ from simultaneously emitting light on the same port, that is, to prevent simultaneous emission of different pump wavelengths.

Figure 9:
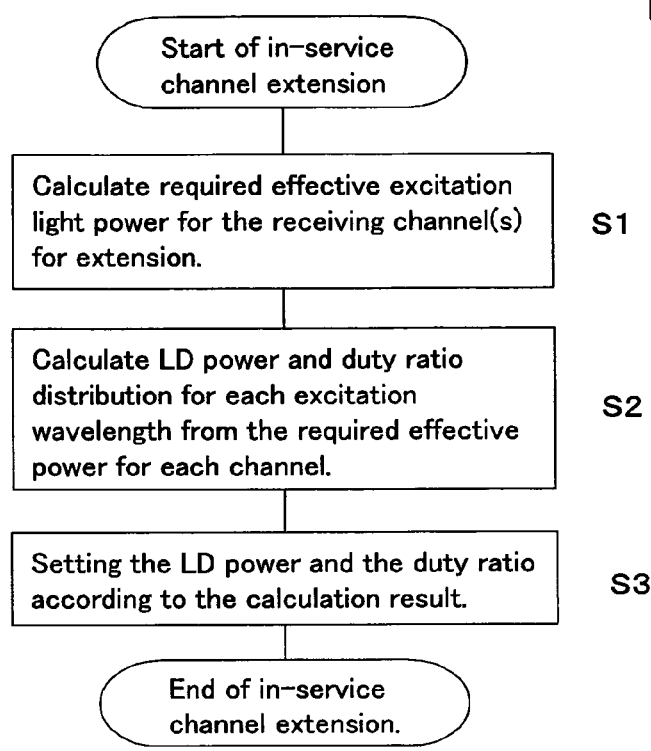
FIG. 9 shows a diagram illustrating a procedure of power control.

Further, it is necessary to adjust power level based on the extended port. For this, the power is controlled according to the procedure shown in FIG. 9.

First, required effective excitation light power is calculated for the receiving port(s) for extension (step S1). This effective power may be calculated by the following method. To perform the process according to this method, a non-illustrated CPU, which is originally provided as a calculation unit, is used as a control unit for controlling switch controller 8 and LD controller 9.

Namely, as a first method, a predetermined value is set on a system design basis. Or, as a second method, an OSNR (optical signal-to-noise ratio) in the preceding node is transferred, the received input level is measured, and then the required pump power is calculated.

Next, distribution of the LD power and the duty ratio to each excitation wavelength are calculated from the required effective power for each port (step S2).

Then, the LD power and the duty ratio are set according to the above calculation result (step S3).

Figure 10:
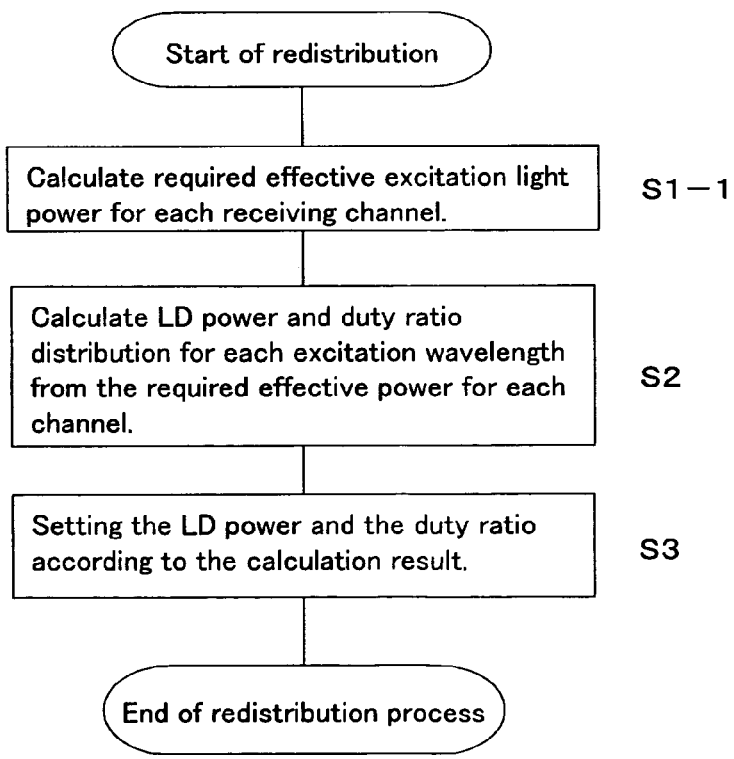
FIG. 10 shows a flowchart illustrating an in-service readjustment process as a fourth embodiment of the present invention.

FIG. 10 shows a flowchart illustrating readjustment process in an operational (in-service) state, as a fourth embodiment of the present invention. The procedure is substantially the same as the in-service port extension process in the third embodiment shown in FIG. 9. Merely the trigger of the process flow is different, namely, the in-service readjustment process is triggered by performance degradation information (such as OSNR information transferred from a preceding node, information based on the OSNR monitoring result in the node of interest), instead of an extension requirement.

Namely, in step S1-1, required effective excitation light power in each receiving port is obtained by the aforementioned method, that is, either by setting a predetermined value on a system design basis, or transferring an OSNR (optical signal-to-noise ratio) in the preceding node, measuring the received input level, and then calculating the required pump power.

The embodiment shown in FIG. 10 is also applicable to a case of switching over the wavelength or channel ports.

To summarize, according to the present invention, in an optical node performing signal distribution to a plurality of ports, particularly when port noise reduction is required, a disposition method of low-cost and high-performance Raman amplification is achieved. With this, it becomes possible to perform extension of a receiving port during an in-service state, optimal reception characteristic control in the in-service state, and optimal control of port characteristic distribution when wavelength or channel ports are switched over in the in-service state.

Further, according to the present invention, by using time division control in a fiber Raman amplifier unit constituted of an integrated structure in an optical node, it becomes possible to obtain an optical node of low noise and low power consumption property, with improved efficiency and reduced size and cost. According to the present invention, it becomes possible to achieve low cost and highly flexible node for signal distribution to a plurality of ports, with Raman amplification function provided on the receiving ports.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. An optical node having a plurality of receiving ports of wavelength-division-multiplex optical signals requiring Raman amplification for low-noise characteristic, comprising:

an excitation light source unit for Raman amplification, generating Raman excitation light of a plurality of wavelengths;

a control unit outputting the generated Raman excitation light of the plurality of wavelengths, wavelength by wavelength on a time division basis; and a Raman amplifier distributing and feeding the Raman excitation light of the plurality of wavelengths, wavelength by wavelength on a time division basis, in the opposite direction to the signal light transmission direction, wherein in each receiving port, a period of the Raman excitation light being output wavelength by wavelength on a time division basis is set shorter than a signal light response time in the Raman amplifier to the Raman excitation light, the excitation light source unit for Raman amplification includes a plurality of Raman excitation light sources corresponding to required frequencies, and the control unit includes, a plurality of switches each corresponding to each of the plurality of Raman excitation light sources, switching and supplying the outputs of the Raman excitation light sources to the plurality of receiving ports, a switch controller controlling the plurality of switches, and a controller controlling light emission from each of the plurality of Raman excitation light sources.

2. The optical node according to claim 1,
wherein, when switching and supplying the Raman excitation light to the plurality of receiving ports, the switch controller controls time-averaged power of the Raman excitation light to be supplied to the receiving ports, by controlling a duty ratio of the Raman excitation light switched by the plurality of switches.

3. The optical node according to claim 1,
wherein the controller controls the Raman excitation light power to be supplied to the receiving ports, by controlling the emission power of the plurality of Raman excitation light sources.

4. The optical node according to claim 1,
wherein, port extension during operation can be achieved by respectively connecting receiving ports for the extension to idle ports in the plurality of switches, and updating a period of switching and supplying the Raman excitation light to the plurality of receiving ports, by the plurality of switches controlled by the switch controller.

5. The optical node according to claim 1, further comprising:
a calculation processing unit for calculating the effective power of the required excitation light for the plurality of receiving ports,
wherein, based on the calculated effective power for the plurality of receiving ports, the calculation processing unit sets to the switch controller the redistribution of a duty ratio of the Raman excitation light to the plurality of receiving ports, and sets to the LD controller the redistribution of emission power of the plurality of luminescence sources of Raman excitation light.

6. The optical node according to claim 5,
wherein the effective power is calculated by measuring an optical signal-to-noise ratio (OSNR) in the preceding node and a received input level, and calculating as required pump power.

* * * * *